Dec. 17, 1946.　　　A. Y. DODGE　　　2,412,803
ONE WAY CLUTCH AND BEARING
Filed Dec. 16, 1944
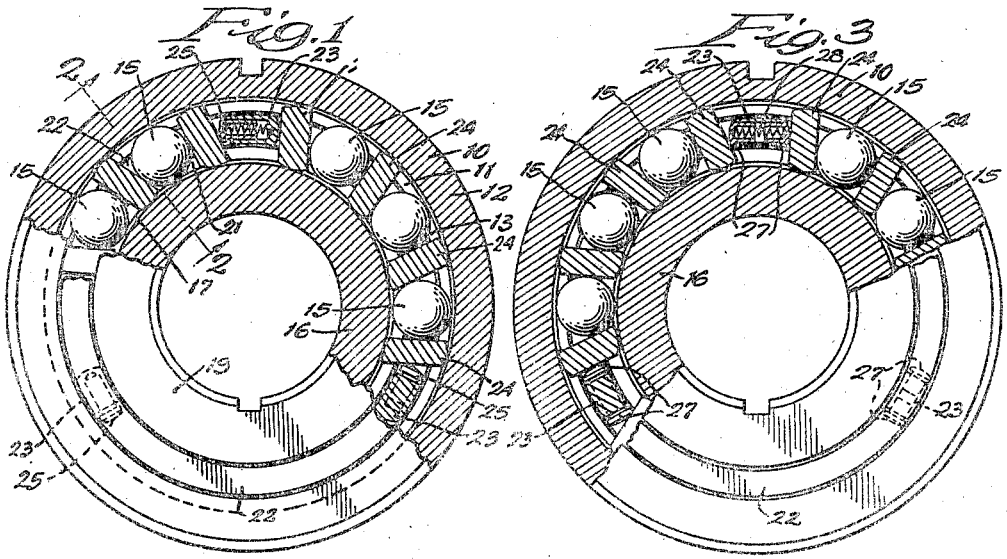
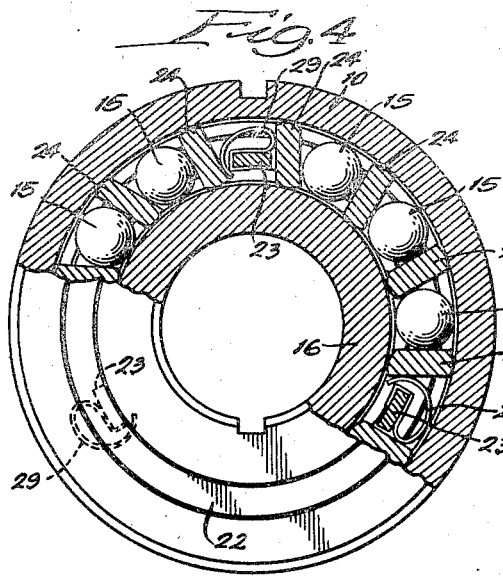
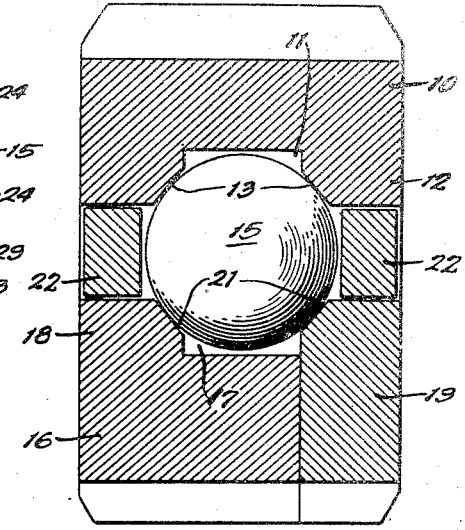

Patented Dec. 17, 1946

2,412,803

UNITED STATES PATENT OFFICE 2,412,803

ONE-WAY CLUTCH AND BEARING

Adiel Y. Dodge, Rockford, Ill.

Application December 16, 1944, Serial No. 568,450

6 Claims. (Cl. 192—45.1)

This invention relates to one way clutch and bearing construction and more particularly to a one way clutch and bearing employing ball bearing units and tiltable grippers.

There has been proposed in my Patent No. 2,307,881 a combined one way clutch and bearing having alternately arranged bearing balls and tiltable grippers with no cage. This construction operates very satisfactorily on units using a relatively small number of balls and grippers but on larger units it is not entirely satisfactory due to the accumulated clearance resulting from gripper action and wear and the build up and wrapping action which takes place between adjacent bearing and gripper units. One of the objects of the present invention is to provide a unit retaining all of the advantages of this prior construction while eliminating the disadvantages in the larger sizes.

Another object of the invention is to provide a one way clutch and bearing in which coaxial races are connected for relative rotation by bearing balls alternating with tiltable grippers to hold the races against rotation in one direction and a cage is provided to hold the balls and grippers properly spaced and positioned.

Another object is to provide a one way clutch and bearing construction in which the balls and grippers are divided into sets by the cage and are yieldingly held in contact by spring means carried by the cage.

Still another object is to provide a cage construction for a combined one way clutch and bearing in which simple and inexpensive but highly effective spring means are provided on the cage to act on the balls and grippers.

The above and other objects and advantages of the invention will be more readily apparent from the following description when read in connection with the accompanying drawing, in which—

Figure 1 is a side elevation with parts in section of a one-way clutch and bearing embodying the invention;

Figure 2 is a partial section on the line 2—2 of Figure 1; and

Figures 3 and 4 are views similar to Figure 1 showing an alternative construction.

The construction shown in Figures 1 and 2 includes an outer race 10 formed with a central peripheral groove 11 on its inner surface and having side flanges 12 projecting inwardly from its opposite sides to define the groove 11. The inner corners of the flanges 12 may be bevelled or otherwise shaped as indicated at 13 to support and ride on bearing balls 15.

An inner race 16 coaxial with the race 10 and of smaller diameter is arranged within the race 10 and is similarly formed with a central groove 17 defined by a fixed flange 18 and a flange ring 19 which may be detachably secured to the ring 16 to permit assembly of the unit. The flanges 18 and 19 are shaped as indicated at 21 to ride against the balls 15. The balls 15 thus serve to connect the races for free relative rotation and to prevent relative axial movement thereof.

A cage construction including a pair of spaced side rings 22 is provided between the races with the rings 22 lying between the ends of the flanges 12 and 18 and 12 and 19 as shown in Figure 2. The side rings are connected by cross bars 23 which may be integral with or otherwise rigidly connected to the side rings. As shown in Figure 1 three such cross bars are provided although more or less could be used as desired. When the parts are assembled the side rings 22 may engage the balls 15 so that the balls hold both the races and the cage against axial displacement.

The cross bars 23 are so spaced that a plurality of balls 15 may be mounted therebetween with tiltable gripper 24 alternating with the balls. The grippers 24 lie in the grooves 11 and 17 and are confined against axial movement by the flanges on the races. When the races tend to rotate in one direction the grippers will tilt into engagement with the bottoms of the grooves to hold the races while when the races tend to rotate in the opposite direction the grippers will tilt out of engagement with the bottoms of the grooves to permit free rotation.

In order to hold the balls and grippers in engagement with each other, each of the cross bars carries a spring member shown as a plug 25 slidably supported in a tangential bore in the cross bar and urged outwardly by a spring 26. The end of the plug engages the adjacent gripper 24 to urge it circumferentially so that the several balls and grippers between adjacent cross bars will be held in contact. As seen in Figure 1, the plugs 25 will engage the grippers below their radial centers tending to tilt them into engagement with the races. The pressure of the plugs will be transmitted thru the series of balls and grippers so that the balls will engage the grippers remote from the cross bars at points spaced from their radial centers and tend to tilt them into engagement.

With this construction, the balls and grippers arranged between the races are divided into relatively small groups which are separately controlled by the spring members carried by the cross bars so that uniform spacing of the balls and grippers around the circumference of the races is maintained at all times. In addition, the pressure against the balls and grippers holding them in contact may be maintained substantially uniform so that the grippers will simultaneously engage the races to hold them against relative rotation and will simultaneously release to permit rotation in the opposite direction.

The construction shown in Figure 3 is substantially similar to that in Figures 1 and 2 and like parts therein are indicated by the same reference numerals. In this construction, the cage cross bars 23 carry oppositely disposed plugs 27 which engage the grippers on opposite sides of the cross bars. A spring 28 between the plugs urges both of them outwardly from the cross bars. With this construction, the gripper at each end of each group of balls and grippers is yieldingly urged circumferentially of the races to maintain a more nearly uniform pressure between the balls and the grippers of each group. Otherwise the construction is substantially identical with that of Figure 1 and operates in the same manner.

Figure 4 illustrates still another type of spring, other parts of the construction shown being indicated by the same reference numerals. In this construction the cage cross bars 23 are relatively narrow flat bars and have connected thereto curved coil springs 29. The springs 29 are shaped to hook over one edge of the cross bars and are curved around to engage the adjacent gripper to urge it circumferentially. It will be noted that the springs are so curved that they engage the grippers at points radially inward of their centers to tend to tilt them toward the position in which they connect the races. Otherwise this construction is similar to that of Figure 1 and operates in the same manner.

While several embodiments of the invention have been shown and described in detail herein, it will be understood that these are illustrative only and are not intended as definition of the scope of the invention, reference being had for that purpose to the appended claims.

What is claimed is:

1. A one way clutch and bearing comprising inner and outer coaxial races formed on their facing surfaces with peripheral grooves defined by spaced parallel flanges, a cage having side rings lying between the flanges of the inner and outer races and spaced cross members connecting the rings, a series of tiltable grippers lying in the grooves on the races and confined by the flanges, bearing balls alternating with the grippers and riding on the flanges to connect the races for relative rotation the bearing balls being engageable with the cage side rings to hold the cage against axial displacement, and springs carried by the cross members engaging the adjacent grippers to hold the grippers and balls in contact.

2. A one way clutch and bearing comprising inner and outer coaxial races formed on their facing surfaces with peripheral grooves defined by spaced parallel flanges, a cage having side rings lying between the flanges of the inner and outer races and spaced cross members connecting the rings, a series of tiltable grippers lying in the grooves on the races and confined by the flanges, bearing balls alternating with the grippers and riding on the flanges to connect the races for relative rotation the bearing balls being engageable with the cage side rings to hold the cage against axial displacement, there being a plurality of balls and grippers between adjacent cross members, and springs carried by each of the cross members to hold the balls and grippers in contact.

3. A one way clutch and bearing comprising inner and outer coaxial races formed on their facing surfaces with peripheral grooves defined by spaced parallel flanges, a cage having side rings lying between the flanges of the inner and outer races and spaced cross members connecting the rings, a series of tiltable grippers lying in the grooves on the races and confined by the flanges, bearing balls alternating with the grippers and riding on the flanges to connect the races for relative rotation the bearing balls being engageable with the cage side rings to hold the cage against axial displacement, there being a plurality of balls and grippers between adjacent cross members with grippers lying next adjacent the cross members, and springs carried by the cross members engaging the adjacent grippers to hold the balls and grippers in contact and to urge the grippers to tilt toward engaged position.

4. A one way clutch and bearing comprising inner and outer coaxial races formed on their facing surfaces with peripheral grooves defined by spaced parallel flanges, a cage having side rings lying between the flanges of the inner and outer races and spaced cross members connecting the rings, a series of tiltable grippers lying in the grooves on the races and confined by the flanges, bearing balls alternating with the grippers and riding on the flanges to connect the races for relative rotation, tangentially extending plugs slidably carried by the cross members, and springs urging the plugs away from the cross members to hold the balls and grippers in contact between the cross members.

5. A one way clutch and bearing comprising inner and outer coaxial races formed on their facing surfaces with peripheral grooves defined by spaced parallel flanges, a cage having side rings lying between the flanges of the inner and outer races and spaced cross members connecting the rings, a series of tiltable grippers lying in the grooves on the races and confined by the flanges, bearing balls alternating with the grippers and riding on the flanges to connect the races for relative rotation, tangentially extending plugs slidably carried by the opposite sides of the cross members to engage the adjacent grippers, and springs urging the plugs away from the cross members to hold the balls and grippers in contact between the cross members.

6. A one way clutch and bearing comprising inner and outer coaxial races formed on their facing surfaces with peripheral grooves defined by spaced parallel flanges, a cage having side rings lying between the flanges of the inner and outer races and spaced cross members connecting the rings, a series of tiltable grippers lying in the grooves on the races and confined by the flanges, bearing balls alternating with the grippers and riding on the flanges to connect the races for relative rotation, and a curved leaf spring carried by each of the cross members and engaging the adjacent gripper to urge it circumferentially thereby to hold the balls and grippers in contact between the cross members.

ADIEL Y. DODGE.